United States Patent [19]

Müller et al.

[11] Patent Number: 4,665,678
[45] Date of Patent: May 19, 1987

[54] LIGHTWEIGHT CONSTRUCTIONS OF INCREASED STRENGTH AND DIMENSIONAL STABILITY

[75] Inventors: Hans Müller, Leverkusen; Lothar Preis, Bergisch-Gladbach, both of Fed. Rep. of Germany

[73] Assignee: Bayer Aktiengesellschaft, Leverkusen, Fed. Rep. of Germany

[21] Appl. No.: 704,343

[22] Filed: Feb. 22, 1985

[30] Foreign Application Priority Data

Mar. 9, 1984 [DE] Fed. Rep. of Germany ....... 3408776

[51] Int. Cl.⁴ .............................................. E04C 2/34
[52] U.S. Cl. .................................. 52/808; 52/309.16; 428/188
[58] Field of Search ................. 52/309.13, 309.16, 576, 52/806, 808; 428/377, 188

[56] References Cited

U.S. PATENT DOCUMENTS

| | | | |
|---|---|---|---|
| 2,754,552 | 7/1956 | Cacciatore | 52/808 X |
| 2,880,473 | 4/1959 | Shwayder | 52/808 |
| 4,068,429 | 1/1978 | Moore | 52/808 X |

FOREIGN PATENT DOCUMENTS

| | | | |
|---|---|---|---|
| 236548 | 2/1959 | Australia | 428/188 |
| 528968 | 6/1954 | Belgium | 428/188 |
| 217960 | 1/1910 | Fed. Rep. of Germany | 52/808 |
| 182512 | 7/1955 | Fed. Rep. of Germany | 428/188 |
| 1272510 | 7/1968 | Fed. Rep. of Germany | 52/808 |
| 1813615 | 7/1970 | Fed. Rep. of Germany | 52/806 |
| 73827 | 9/1960 | France | 428/188 |
| 1495245 | 9/1967 | France | 52/808 |
| 706633 | 5/1966 | Italy | 52/808 |

*Primary Examiner*—Carl D. Friedman
*Assistant Examiner*—Naoko N. Slack
*Attorney, Agent, or Firm*—Sprung Horn Kramer & Woods

[57] ABSTRACT

A lightweight construction with sandwich elements consisting of core and covering surfaces may be produced in that high-strength hollow profiles are fixed to a molded frame at a spacing from each other, the remaining space around the hollow profiles is filled with a pressure-resistant casting compound which supports the profiles, and the top layers which determine the bending resistance of the elements are applied thereto. In this manner multidimensionally curved covering surfaces of unlimited size, such as the bodies of boats, can be economically produced.

3 Claims, 5 Drawing Figures

LIGHTWEIGHT CONSTRUCTIONS OF INCREASED STRENGTH AND DIMENSIONAL STABILITY

BACKGROUND OF THE INVENTION

This invention relates to a wall element with a sandwich structure consisting of a core and two covering surfaces for bodies with optionally multidimensionally curved covering surfaces.

Lightweight constructions with multidimensionally curved covering surfaces of fiber-reinforced reaction resins are known. The bodies of boats, for example, can be built from such wall elements and the example of boat building illustrates the disadvantages of the materials hitherto used. In one method of production, the negative mold of the body of the boat is built from several layers of reaction resin-impregnated glass fabric or mats in a laminating process. The requisite wall thickness of the laminate is determined by the desired rigidity of the construction. This method is costly because in order to produce the actual shape, a full-size positive model has firstly to be prepared from which the actual working shape is taken in a further operation. The production of the mold is time-consuming and expensive and is generally only justified if there is to be subsequent mass production. With a view to increasing the profitability of producing small numbers of items, a proposal was made to use a light wooden base construction of light shaping mold instead of the laminating mold. Such a molding frame is planked with glass fabric, which contains the reaction resin-impregnated glass fiber rods as supporting elements which have hardened, and is impregnated after bracing with reaction resin. After this supporting planking has hardened, the laminate is subsequently built up in conventional manner, layer by layer, with glass fiber mats and/or fabrics, until the desired wall thickness is obtained (®C flex").

Bodies with multidimensionally curved surfaces may be produced by this method but the strength of the fiber reinforced plastics material is not fully exploited, as the laminate wall thickness and consequently the weight of the body are not determined by the required strength but by the desired rigidity of the body.

Good dimensional stability can be achieved at a relatively low gross weight by using moderately thick laminates in conjunction with bracing elements, such as longitudinal and transverse ribs or spars. Typical of constructional methods of this type are, for example, boat bodies of glass fiber reinforced plastic laminates produced in negative molds, and all boat bodies of steel and aluminium.

A more advantageous method of achieving greater dimensional stability in bodies which are stressed on bending, with a view to the improved use of the properties of the material, consists of applying layers of materials, which are resistant to tensile stress and pressure, onto sufficiently pressure-resistant intermediate layers arranged at a spacing from each other, such that the shearing stresses, produced when the entire cross-section in the transition zone from the outer layer to the intermediate layer is mechanically stressed, can be withstood. Such sandwich structures are particularly light and have high flexural strength and additional reinforcing structural members are not generally necessary.

Sandwich elements of rigid foams and top layers of glass fiber reinforced plastic laminates are known which may be produced by the covering or the filling method. While the prefabricated foam parts are planked with the laminates in the covering method, two outer laminate shells are generally used in the foaming method which are then foamed out in a second operation. Relatively costly molds are required in both cases so that this technique is only profitable for the production of a relatively large number of items and, furthermore, permits only the production of bodies of limited size.

The RFK method (RFK is a registered trade mark, an abbreviation for the expression "Rohr-Fiber-Kunstoff", i.e. tube-fiber-plastics material) permits the production of sandwich constructions without using molds. In this process, longitudinally-oriented hollow profiles of thermoplasts are applied in rows without gaps onto transversely arranged shaped members and are subsequently coated on both sides with synthetic resin laminates.

An advantage of this method resides in the fact that it is possible to produce bodies of substantial size at relatively low production costs. Although RFK sandwich elements are superior to laminates of the same weight, regarding flexural strength, the size of the moldings which may be produced is limited. The shaping tubes make virtually no contribution to the strength of the body; furthermore, they have only relatively poor resistance to compression. The sandwich structure can be permanently deformed by creeping as a result of the locally confined, relatively long or permanent effects of load, particularly at elevated temperature. Problems also arise with dynamic stress, as the very different behavior of the core and top layers can cause signs of loosening.

SUMMARY OF THE INVENTION

An object of the present invention is to provide a material which permits the production of self-supporting curved walls of any size with good load carrying ability and dimensional stability without the use of expensive molds.

This object is achieved by a wall element which is characterized in that hollow profiles with good resistance to tensile stress are arranged in the core, which profiles do not lie in close contact with each other, and the remaining space in the core about the hollow profiles is filled with a pressure-resistant casting compound which supports these profiles. The resistance to tensile stress of the hollow profiles should be more than 1000 $N/mm^2$, based on the supporting cross-section, and the resistance to compression of the casting compound should be at least 15 $N/mm^2$. In a preferred embodiment, the hollow profiles consist of fiber composites, preferably with monodirectionally oriented fibers, most preferably of glass. In a further preferred embodiment, the crosssection of the hollow profiles is circular.

The resistance to compression of the casting compound is generally matched to the hollow profiles. The resistance to compression of the casting compound should be at least as great as the resistance to transverse pressure of the hollow profiles. The support of the hollow profiles, which is homogeneous on all sides, is essential for the exploitation of their properties of strength and rigidity. The minimum spacing of the hollow profiles is about 1 mm. The spacing between two hollow profiles should preferably not be greater than 3 times the diameter of the hollow profile. The lateral laminate covering of round hollow profiles should be at least 3 mm.

The sandwich structures according to the invention are distinguished by good strength and rigidity at a particularly low specific weight. However, they may nevertheless be shaped without being damaged. They have very favorable behavior under impact stress. A particular advantage of the wall elements according to the invention which have a sandwich structure is that the shaping hollow profiles make a decisive contribution to the strength and rigidity of the entire structure, unlike the known sandwich supporting cores, such as foams, webs or thermoplast tubes.

The wall elements with a sandwich structure may be produced in a straightforward manner without the use of expensive molds, and provide possibilities for varied shapes, because the unmolded, flexible hollow profiles can be adapted to multidimensionally patterns.

Structures can be produced having dimensions which, with the same strength and rigidity, could hitherto only be achieved in a metal construction with a greater weight. Furthermore, the new sandwich wall elements have a substantially better heat-insulation and damping behavior than corresponding metal constructions.

The production of objects with wall elements according to the invention is described, for example, with reference to the production of the body of a boat. The desired shape is produced with a simple moulding frame of sections of wood, onto the outside of which the preferably round flexible hollow profiles are fixed. The spacing between the individual hollow profiles is determined by the bearing strength desired. It is preferably from 1/100 to 3 times the diameter of the profile. After the hollow profiles have been oriented and fixed, the gaps between the tubes are completely filled with a casting compound, and smoothed over so that even homogeneous outer surfaces are produced. In order to reduce the weight, it is advantageous to use a casting compound which slightly foams on curing. In order for the mechanical strength values to be fully exploited, the minimum resistance to compression of the casting compound has to be observed.

High-strength hollow profiles of fiber composites, particularly with a round cross-section, are suitable for the production of the wall elements according to the invention with the sandwich structure. Glass fiber composites with monodirectionally orientated reinforcing fibers, as described, for example, in German Offenlegungsschrift No. 2 735 538, are preferred. However, the invention is not restricted to this type of profile.

The supporting hollow profiles can also be used in conjunction with other core materials, such as balsa wood or rigid foam profiles, and this can reduce the gross weight and/or make the operation more economical.

All fillable reaction resin compositions which have sufficient resistance to pressure and good adhesion to the hollow profiles and laminate layers, preferably foamable filling compositions or synthetic foams which become smoothable after curing, can be used to fill the gaps between the hollow profiles.

Woven fabric, mats or deposited fabric of reinforcing fibers which are impregnated with reaction resins and subsequently stiffened in a known manner can be used for the top layer. The number, type and arrangement of the layers of laminate are determined according to the required strength and rigidity of the structure.

The present invention is illustrated in the drawings and is described in more detail in the following. In the drawings:

DETAILED DESCRIPTION OF THE INVENTION

Figure 1:
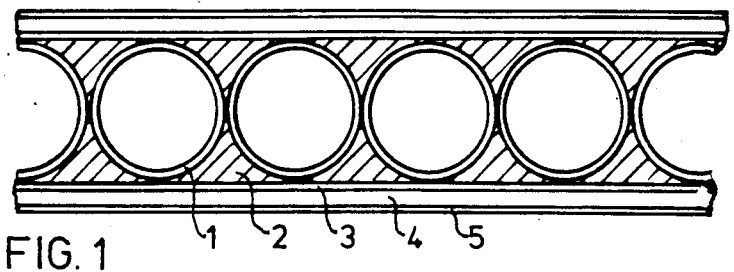
FIG. 1 shows a cross-section through a plane, tubular-sandwich plate.

FIG. 1 shows the typical structure of a plane wall element. Tubes of a glass fiber composite with monodirectional fiber orientation 1 are homogeneously embedded in the pressure-resistant light filling composition 2. The minimum spacing between two hollow profiles is 2 mm. The supporting outer layers are designed symmetrically on both sides. They consist of a multi-layered laminate with a layer of monodirectional woven fabric 3, two layers of glass fiber mats 4 and a protecting layer of lacquer 5.

The hollow profile of monodirectionally oriented glass fiber strands and unsaturated polyester resin (isophthalic acid-base) with an outer diameter of 16 mm and a wall thickness of 1 mm (glass fiber proportion 80% by weight) is firstly fixed to a wood frame. The gaps between the tubes are then filled with a filling composition of polyester resin-(isophthalic acid)-base, which contains 50% by weight of micro-hollow beads of phenol resin (micro-balloons) and 2.5% of benzoyl peroxide and 0.8% of 10% diethylaniline solution as a curing system to reduce the specific weight, and are then smoothed off. Any slight remaining unevenness in the surface is ground off after the filling composition has hardened. A mono-directional fabric (fiber orientation perpendicular to the orientation of the tube) of type 92253 (manufacturer: Interglas) with a surface weight of 490 g/m$^2$ is firstly laminated onto both sides of the resulting smooth outer surfaces followed by two layers respectively of the glass mats M 113-10, each of 300 g/m$^2$ (manufacturer: Gevetex) using the polyester resin on which the filling composition is based.

The weight of a finished sandwich plate is 15.8 kg/m$^2$, and the total thickness is 20 mm.

In order to determine the bearing strength, test bodies of 800×20 mm are cut from the plate parallel to the orientation of the fibers of the monodirectional layer and perpendicular thereto and are tested in the 3-point-bending test.

Results of the test:
(a) Test direction parallel to the orientation of the monodirectional layer
Tensile strength : 168 MPa
Modulus of elasticity: 8224 MPa
Deflection : 61.8 mm
Peripheral fiber extension : 2.1%.
(b) Test perpendicular to the orientation of the monodirectional layer Testing strength : 95.6 MPa
Modulus of elasticity: 6177 MPa
Deflection : 42.5 mm
Peripheral fiber extension : 1.8%.

Figure 2:
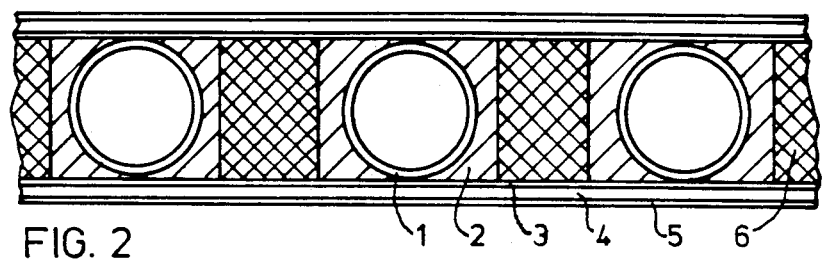
FIG. 2 shows a cross-section through a sandwich plate which contains intermediate parts of balsa wood in the core in addition to hollow profiles.

FIG. 2 shows the cross-section of a sandwich structure in which the core layer consists of alternately arranged glass fiber composite tubes 1 and balsa wood profiles 6. The remaining structure is as in FIG. 1.

Figure 3:
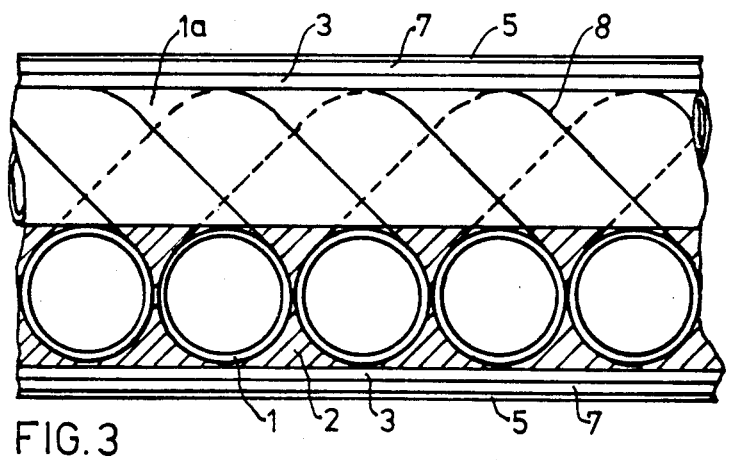
FIG. 3 shows a wall element with two core layers of fiber composite tubes arranged at an angle of 90° to each other.

FIG. 3 shows a further embodiment of the present invention, consisting of two layers of glass fiber composite tubes 1 and 1a which are arranged at an angle of 90° to each other. The tubes are connected to each other with the aid of resin-impregnated and hardened glass fiber strands 8. The top layers consist of two layers of high strength monodirectional fabric 3 and 7 and are provided with a protecting decorative layer of lacquer 5.

Figure 4:
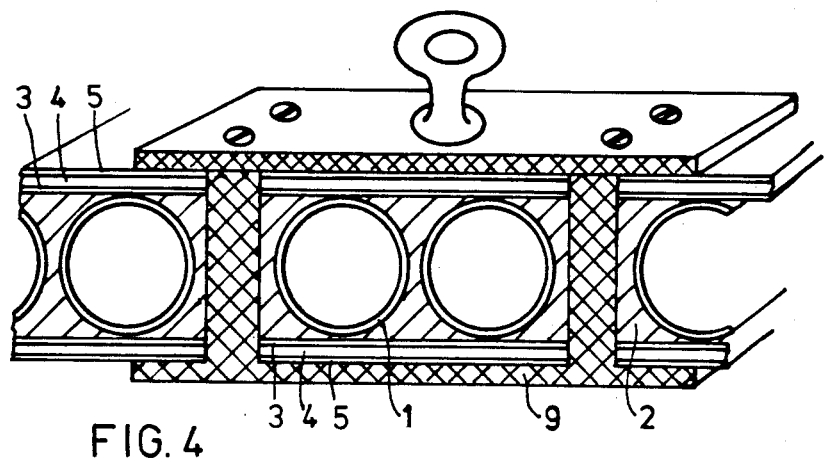
FIG. 4 shows a wall element connected to a fixing element.

FIG. 4 shows how fixing elements 9 can be included in the production of the wall element according to the invention. The structure of the sandwich is as in FIG. 1.

Figure 5:
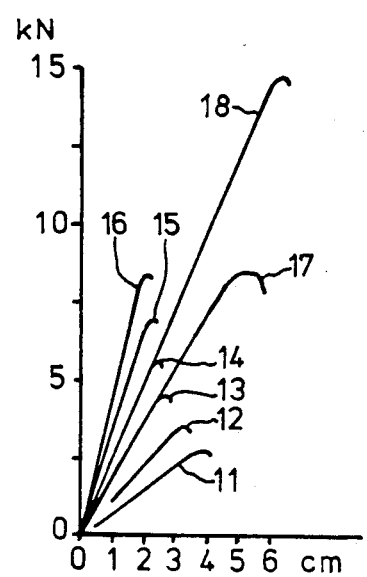
FIG. 5 shows a comparison of the mechanical properties of a wall element according to the invention with a metallic plate.

FIG. 5 shows mechanical characteristic values of the wall elements according to the invention compared with known metallic material. The Y-axis gives the bending force in kN and the X-axis gives the deflection in cm. The support spacing is 600 mm. The shorter curves 11 to 16 are results from an aluminium alloy AlMgMnF 26, the plate thickness increasing in 11 to 16 from 7 mm, 1 mm at a time up to 12 mm. Curves 17 to 18 characterize the properties of the above-described plate. 17 is stressed in the transverse direction and 18 is stressed in the longitudinal direction of the mono-directional fabric 3.

What is claimed is:

1. A wall element for use in the production of three dimensional curved walls and having a sandwich structure comprising a core and two covering surfaces, wherein the core comprises hollow cylindrical tubular profiles having a tube axis and good resistance to tensile stress and which are spaced apart a minimum of 2 mm, wherein the remaining space in the core around the hollow profiles is filled with a pressure-resistance casting compound which supports the profiles, wherein the tubes consist of monodirectional glass fiber strands oriented in the direction of the tube axis and embedded in unsaturated polyester resin and which are wrapped by monodirectional glass fiber strands oriented perpendicular to the tube axis and wherein the covering surfaces are identical and are connected directly to the profiles by the casting compound.

2. An element according to claim 1, wherein the resistance to tensile stress of the hollow profiles is at least 1000 N/mm$^2$, based on the bearing cross-section.

3. An element according to claim 2, wherein the resistance to compression of the casting compound is at least 15 N/mm$^2$.

* * * * *